US010843749B2

(12) United States Patent
Schroyer et al.

(10) Patent No.: US 10,843,749 B2
(45) Date of Patent: Nov. 24, 2020

(54) STRADDLE MOUNT IDLER ASSEMBLY

(71) Applicant: L&H Industrial, Inc., Gillette, WY (US)

(72) Inventors: William Howard Schroyer, Gillette, WY (US); James Lee Meinen, Cedar Grove, WI (US); Jordan Trae Rhodine, Gillette, WY (US)

(73) Assignee: L&H INDUSTRIAL, INC., Gillette, WY (US)

( * ) Notice: Subject to any disclaimer, the term of this patent is extended or adjusted under 35 U.S.C. 154(b) by 433 days.

(21) Appl. No.: 15/959,117

(22) Filed: Apr. 20, 2018

(65) Prior Publication Data
US 2019/0322325 A1 Oct. 24, 2019

(51) Int. Cl.
B62D 55/15 (2006.01)
B62D 55/092 (2006.01)
(Continued)

(52) U.S. Cl.
CPC ......... B62D 55/15 (2013.01); B62D 55/0847 (2013.01); B62D 55/092 (2013.01); F16C 17/107 (2013.01)

(58) Field of Classification Search
CPC ...... B62D 55/14; B62D 55/145; B62D 55/15; F16C 17/10; F16C 17/107
See application file for complete search history.

(56) References Cited

U.S. PATENT DOCUMENTS 3,795,428 A * 3/1974 Paine .................... F16C 13/006
384/286

4,083,610 A * 4/1978 Kruchowski .......... B62D 55/08
305/130
(Continued)

FOREIGN PATENT DOCUMENTS

CN 201980313 U 9/2011
CN 201980315 U 9/2011
(Continued)

OTHER PUBLICATIONS

L&H Industrial, "L&H Omega Straddle Mount Idler", https://www.lnh.net/product/lh-omega-straddle-mount-idler/, 8 pages, Feb. 27, 2017.
(Continued)

Primary Examiner — Scott A Browne
(74) Attorney, Agent, or Firm — FisherBroyles LLP; Ian R. Walsworth

(57) ABSTRACT

A straddle mount idler assembly for use with a crawler assembly of a crawler machine. The straddle mount idler assembly includes an idler wheel positioned between inboard and outboard arms of a crawler assembly, the idler wheel fixed both rotationally and axially to an idler shaft. The wheel and shaft are fixed rotationally via locking key and axially via segmented retaining plate and bolts. The axial coupling of the wheel and shaft allows for axial thrust to be controlled outboard the crawler frame for easier access and maintenance. A sealed thrust plate assembly with a dedicated lubrication port is mounted to each bearing block. A retainer nut threadably engages the idler shaft, allowing ready tightening of the retainer when the thrust plate experiences wear, and the retainer nut is fixed to the shaft via a locking bar. A set of integrated inspection ports enable inspection and measurement of the thrust plate without splitting crawler tracks.

17 Claims, 8 Drawing Sheets

(51) Int. Cl.
*B62D 55/084* (2006.01)
*F16C 17/10* (2006.01)

(56) References Cited

U.S. PATENT DOCUMENTS

| | | | |
|---|---|---|---|
| 9,187,140 | B2 | 11/2015 | Sandoval |
| 2001/0054844 | A1 | 12/2001 | Rutz et al. |
| 2013/0102427 | A1* | 4/2013 | Sandoval, Jr. .......... F16C 17/10 474/198 |

FOREIGN PATENT DOCUMENTS

| | | | |
|---|---|---|---|
| CN | 103465978 | A | 12/2013 |
| CN | 103481959 | A | 1/2014 |
| CN | 104973156 | A | 10/2015 |
| CN | 105584547 | A | 5/2016 |
| CN | 106143661 | A | 11/2016 |
| CN | 106256668 | A | 12/2016 |
| CN | 107972751 | A | 9/2017 |
| CN | 109720429 | A | 10/2017 |
| CN | 207536008 | U | 10/2017 |
| CN | 207670518 | U | 12/2017 |
| CN | 208021575 | U | 2/2018 |
| CN | 108163065 | A | 6/2018 |
| CN | 208007125 | U | 10/2018 |
| DE | 19959817 | A | 12/2001 |
| EP | 1495949 | A1 | 1/2005 |

OTHER PUBLICATIONS

Examination Report from related CL201802497(with Chilean associate's report), dated Jun. 15, 2020.

Examiner Requisition from related CA3011550, Sep. 5, 2019. 10 pages.

Search Report from related CL201802497, dated Jun. 15, 2020, 3 pages.

* cited by examiner

STRADDLE MOUNT IDLER ASSEMBLY

FIELD OF THE INVENTION

The disclosure relates generally to idler assemblies, and specifically to straddle mounted idler assemblies for machines.

BACKGROUND OF THE INVENTION

Heavy equipment is used in a variety number of machines, particularly in industries requiring movement of large loads. Applications of heavy equipment include the fields of construction, oil and gas, mining, forestry, and the like. Track type work machines are widely used in environments where sufficient traction is required to move equipment and supplies. Conventional track type assemblies used in track type work machines typically use a continuous track, also referred to as chains and belts. A drive wheel transmits power to the continuous crawler track, while a non-powered idler assembly guides the continuous track. The idler assembly typically includes an idler wheel. Idler assemblies may also serve to bear a portion of the weight of the machinery.

Because of the forces involved in heavy equipment operations, the components of idler assemblies, such as idler wheels and idler shafts, are subject to wear and frictional forces, such as torsional and thrust forces. One or more thrust surfaces, such as thrust plates, are typically positioned between elements of an idler wheel assembly known to exhibit torsional or thrust forces. The thrust plates provide a sacrificial wear surface or wear plane. Conventional idler wheel designs position thrust surfaces in locations that are difficult to maintain, difficult to assemble, difficult to observe, and/or are limited in design (wear) life. For example, in the straddle mount idler wheel design described in U.S. Pat. No. 9,187,140 to Sandoval, a thrust plate is positioned within an interior aperture defined by adjacent arms of a crawler frame, a configuration that, for example, is difficult to inspect for thrust plate wear. By way of providing additional background, context, and to further satisfy the written description requirements of 35 U.S.C. § 112, U.S. Pat. No. 9,187,140 to Sandoval is incorporated by reference in entirety.

What is needed is a straddle mount idler assembly that is easily assembled, provides ready inspection for wear, and that fixes the idler wheel to the idler shaft both radially and axially. This disclosure addresses these needs, among others. The straddle mount idler assembly provides an idler wheel that is fixed or locked both rotationally and axially to an idler shaft, and that provides easy and ready inspection of a sealed thrust wear surface. Furthermore, the idler wheel assembly is easier to maintain and assemble than existing idler wheel assemblies.

SUMMARY OF THE INVENTION

The present disclosure can provide several advantages depending on the particular aspect, embodiment, and/or configuration.

Idler assemblies generally include an idler wheel engaged with a crawler track along an outer diameter. A central idler shaft, mounted between arms or extensions of a front portion of a crawler frame, passes through a central bore of the idler wheel. The shaft is then received by bearing blocks within the crawler arms. A journal bearing, or bushing, is fitted between the bearing blocks and the shaft, creating a bearing surface in which the shaft and idler wheel rotate within. This is known as a straddle mounted front idler assembly since the idler wheel is "straddled" by the bearing surfaces on either side of the crawler frame extensions. The straddle mounted idler design is fundamentally different from a standard dead axle design. In a dead axle design, the shaft is fixed from rotating, while the idler wheel receives a journal bushing. The bearing surface is centered in the crawler frame extensions, and the idler wheel rotates about the shaft.

In order for the shaft and wheel to rotate integrally amongst the bearing surface they must be coupled rotationally. Typically splines or keys are used. In one embodiment of the disclosure, the idler wheel and shaft are coupled rotationally via a standard key on the shaft and corresponding keyway in the wheel. In contrast, many idler assemblies fix or lock the idler wheel to the idler shaft rotationally, but not axially.

To allow the shaft and the wheel to translate axially together, the pair must be coupled translationally. In one embodiment of the disclosure, a segmented retaining plate is fastened to the idler wheel which retains movement of the shaft. A thrust plate, also known as a thrust washer, is mounted outboard of each crawler frame extension in a thrust plate housing which provides an axial wear surface to accommodate axial movement of the wheel and shaft. A retainer nut is threaded onto both ends of the idler shaft and secured rotationally by a locking bar. By locking the retainer nut to the end of the shaft, the retainer nut rotates and translates axially with the shaft. Finally, as the wheel and shaft rotate and translate axially, the torsional force and axial thrust are transmitted from the retaining nut to the thrust plate. By utilizing a thrust plate and a retainer nut on both ends of the shaft, a thrust surface is created in both directions and the shaft may translate axially.

The retainer nut threadably engages the idler shaft, allowing ready tightening of the retainer nut with wear of the thrust plate. Several notches on the outer diameter of the nut allow for multiple increments of adjustment to align the locking bar with the corresponding groove on the shaft. A set of integrated inspection ports enable inspection of the thrust plate and allow measurement of thrust plate wear without the need to remove the retaining nut.

The thrust plate is fastened to the face of the bearing block, which seats in the aperture formed between the crawler arms. The thrust plate provides ample surface area to increase runtime between maintenance intervals. In another aspect, the thrust plate incorporates a grease port to decrease frictional forces induced from the retainer nut. In another aspect, the thrust plate is housed within a sealed enclosure configured such that the seal is positioned on the outer diameter of the retainer nut.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine," "calculate," and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

In one particular embodiment, a front idler assembly is disclosed, the assembly comprising: an idler wheel comprising a bore therethrough and configured to operate within a front aperture of a crawler frame; an inboard arm and an outboard arm, each formed on a distal end of the crawler frame and together defining the front aperture; an idler shaft passing through the bore and coupled to each of the inboard arm and the outboard arm; a pair of journal bearings housed within a respective pair of bearing block assemblies, the pair of journal bearings positioned adjacent an inboard side and an outboard side of the idler wheel; a segmented retaining plate connected to each of an outboard vertical face of a hub of the idler wheel and an outboard shoulder of the idler shaft; and an outboard retainer assembly coupled to an outboard end of the idler shaft; wherein the idler wheel is fixed relative to the idler shaft both axially and rotationally.

In one aspect, the segmented retaining plate axially fixes the idler wheel relative to the idler shaft. In another aspect, the segmented retaining plate comprises at least three retaining plate segments. In another aspect, the segmented retaining plate is connected to the idler wheel and to the idler shaft by a set of plate bolts. In another aspect, the assembly further comprises a set of wedge locking washers connected to the set of plate bolts, the set of wedge locking washers enable a preload to the segmented retaining plate. In another aspect, the idler wheel is rotationally fixed relative to the idler shaft by way of a locking key. In another aspect, a locking bar is configured to engage a shaft groove formed on a distal end of the idler shaft. In another aspect, the locking bar rotationally fixes a retainer nut relative to the idler shaft. In another aspect, the assembly further comprises a thrust plate, the thrust plate disposed outboard of the outboard arm and configured to receive a friction force. In another aspect, the thrust plate is connected to a dedicated lubrication port. In another aspect, the assembly further comprises a second thrust plate disposed outboard of the inboard arm. In another aspect, the outboard retainer assembly comprises a retainer nut configured to threadably engage the idler shaft. In another aspect, the retainer nut comprises a set of inspection ports configured to enable measurement of a depth of a thrust plate, the thrust plate disposed outboard of the outboard arm and configured to receive a friction force.

In another particular embodiment, a straddle mount idler device is disclosed, the device comprising: an idler shaft configured to pass through adjacent windows of an inboard arm and an outboard arm of a crawler frame; an idler wheel coupled to the idler shaft through a central bore of the idler wheel; a pair of journal bearings coupled to the idler wheel and positioned on an inboard side and an outboard side of the idler wheel; a first thrust plate and a second thrust plate, the first thrust plate positioned outboard of the outboard arm and the second thrust plate positioned outboard of the inboard arm, each thrust plate configured to receive at least axial force received from the idler shaft; wherein the idler wheel and the idler shaft are locked radially and locked axially.

In one aspect, each of the first thrust plate and a second thrust plate are: sealed from external contaminants; connected to a dedicated lubrication port; accessible without splitting of crawler tracks engaged with the crawler frame; and measurable for wear by way of a set of inspection ports. In another aspect, the device further comprises a pair of journal bearings housed within a respective pair of bearing block assemblies, wherein: the pair of journal bearings are positioned adjacent an inboard side and an outboard side of the idler wheel; and the first thrust plate and a second thrust plate are coupled to a respective bearing block assembly. In another aspect, the device further comprises a retainer nut configured to threadably engage the idler shaft and to receive a locking bar along a set of radial grooves formed on a distal end of the retainer nut; and a segmented retaining plate connected to each of an outboard vertical face of a hub of the idler wheel and an outboard shoulder of the idler shaft; wherein: the segmented retaining plate axially fixes the idler wheel relative to the idler shaft; and the locking key rotationally fixes the idler wheel relative to the idler shaft.

In yet another particular embodiment, a straddle mount idler device is disclosed, the device comprising: an idler wheel comprising a bore therethrough and configured to operate within a front aperture of a crawler frame; an idler shaft passing through the bore and configured to pass through adjacent windows of an inboard arm and an outboard arm of the crawler frame; a pair of journal bearings coupled to the idler wheel and positioned adjacent an inboard side and an outboard side of the idler wheel; an outboard retainer assembly coupled to an outboard end of the idler shaft, the outboard retainer assembly comprising a retainer nut configured to threadably engage the idler shaft and to receive a locking bar along a set of radial grooves formed on a distal end of the retainer nut; wherein: the set of radial grooves allow incremental adjustment of the retainer nut; the retainer nut comprises a set of apertures configured to receive a round bar and a set of inspection ports; the idler wheel is fixed relative to the idler shaft both axially and rotationally; and the locking key rotationally fixes the idler wheel relative to the idler shaft.

In one aspect, the device further comprises a first thrust plate and a second thrust plate, the first thrust plate positioned outboard of the outboard arm and the second thrust plate positioned outboard of the inboard arm, each thrust plate configured to receive at least axial force received from the idler shaft; wherein: each of the first thrust plate and a second thrust plate are: sealed from external contaminants; connected to a dedicated lubrication port; accessible without splitting of crawler tracks engaged with the crawler frame; and measurable for wear by way of the set of inspection ports; and the retainer nut further is configured to receive a tool that engages the radial grooves, the tool configured to couple to at least one of an impact tool and a hydraulic wrench. In another aspect, the device further comprises a segmented retaining plate connected to each of an outboard vertical face of a hub of the idler wheel and an outboard shoulder of the idler shaft; wherein: the segmented retaining plate axially fixes the idler wheel relative to the idler shaft.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION OF VARIOUS EMBODIMENTS

Reference will now be made in detail to representative embodiments illustrated in the accompanying drawings. While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting.

The use of "including," "comprising," or "adding" and variations thereof herein are meant to encompass the items listed thereafter and equivalents thereof, as well as, additional items. The following disclosure generally relates to idler assemblies, and specifically to straddle mounted idler assemblies for machines.

With attention to FIGS. 1-7, an undercarriage 10 used in a lower portion of a machine is presented. An undercarriage 10 is typically used in pairs on adjacent sides of track type heavy equipment machines, such as those used in construction, oil and gas, mining, forestry, etc. Each of the paired undercarriage 10 comprise a crawler frame 20 and a front idler assembly 21. The crawler frame 20 is coupled to continuous tracks, i.e. chains or belts, which wrap around the undercarriage 10 and engage an idler wheel 30. The continuous tracks travel in a continuous loop around the crawler frame of the undercarriage 10 when the machine is in motion. A drive wheel transmits power to the continuous track, while an idler wheel 30 of a non-powered front idler assembly 21 guides the continuous track.

Figure 1:
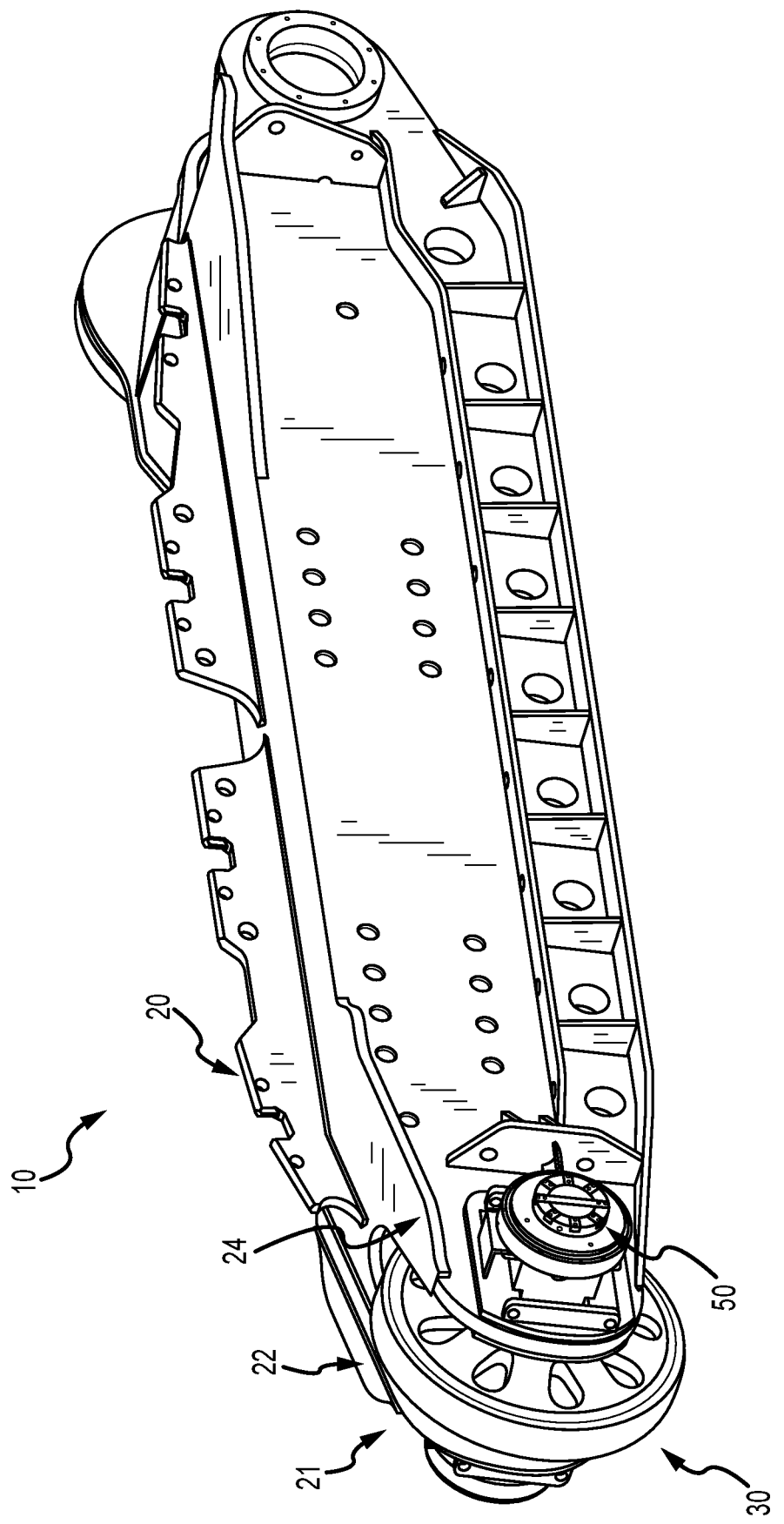
FIG. 1 is a left front perspective view of a portion of a crawler assembly with one embodiment of a front idler assembly of the disclosure.
Figure 2:
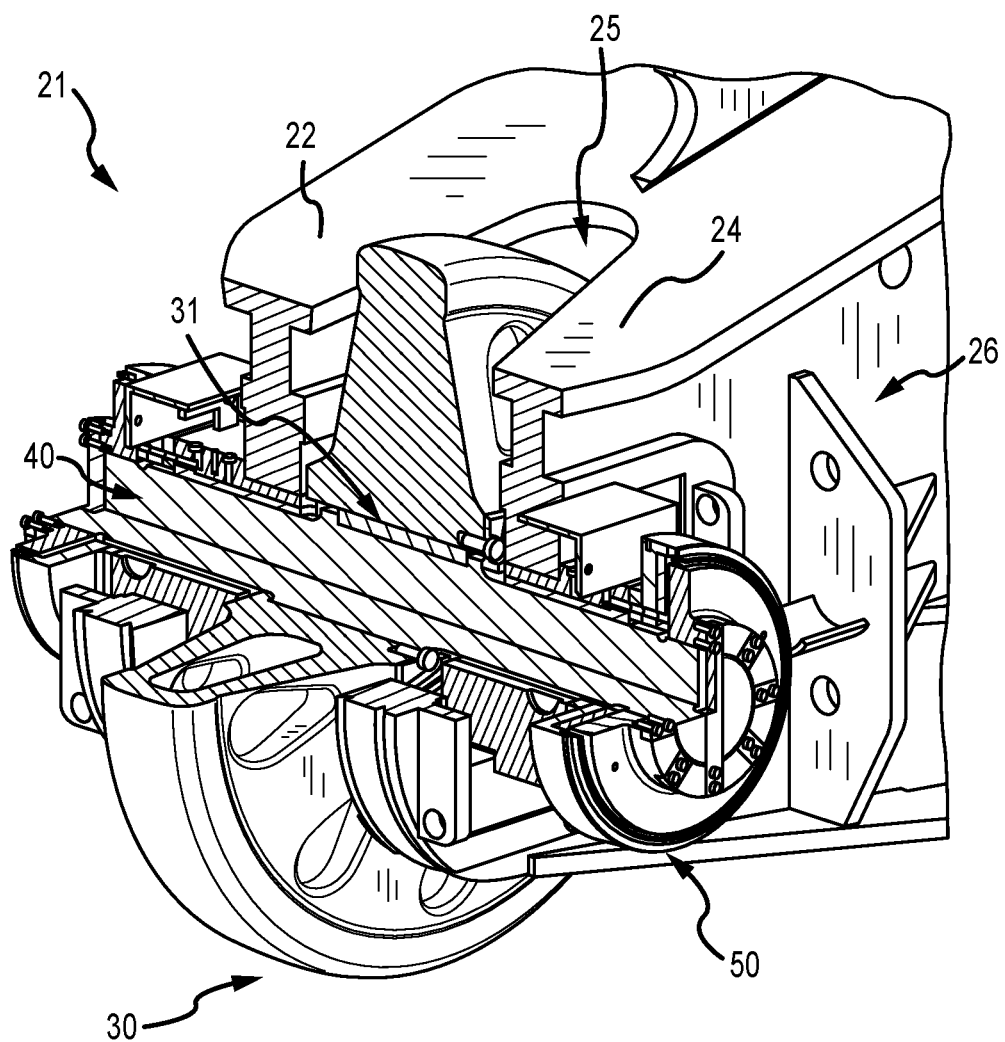
FIG. 2 is a cross-sectional, cut-away view of the front idler assembly of FIG. 1.
Figure 3:
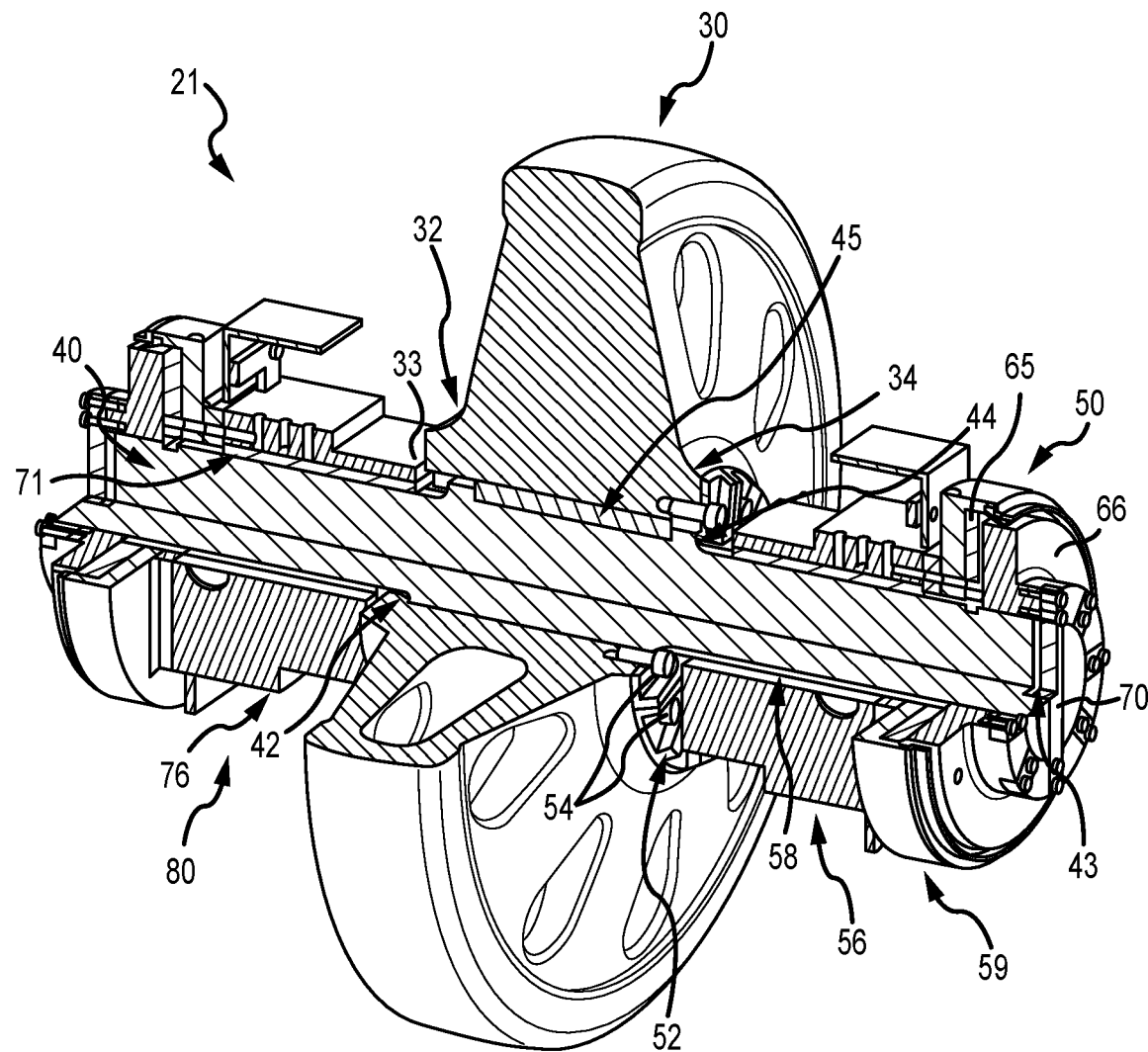
FIG. 3 is another cross-sectional, cut-away view of the front idler assembly of FIG. 1.

An inboard arm 22 and an outboard arm 24 are formed on a distal end of the crawler frame 20. The inboard arm 22 and the outboard arm 24 together define a front aperture 25 of the crawler frame 20. An idler wheel 30 is disposed between the inboard arm 22 and the outboard arm 24 and at least partially within the front aperture 25. The idler wheel 30 operates within the front aperture 25. The term "inboard" means inside of an element or a machine or toward the inside of an element or machine. The term "outboard" means outside of an element or a machine or toward the outside of an element or machine. As an example, for a typical crawler machine with two adjacent undercarriage 10 elements, each with an idler wheel 30 positioned at the front of the machine, the undercarriage 10 of FIG. 1 depicts a left side undercarriage 10 of a crawler machine, such that the inboard arm 22 faces the interior of the machine (and faces an adjacent right side undercarriage 10), and the outboard arm 24 faces an exterior of the machine.

Figure 4:
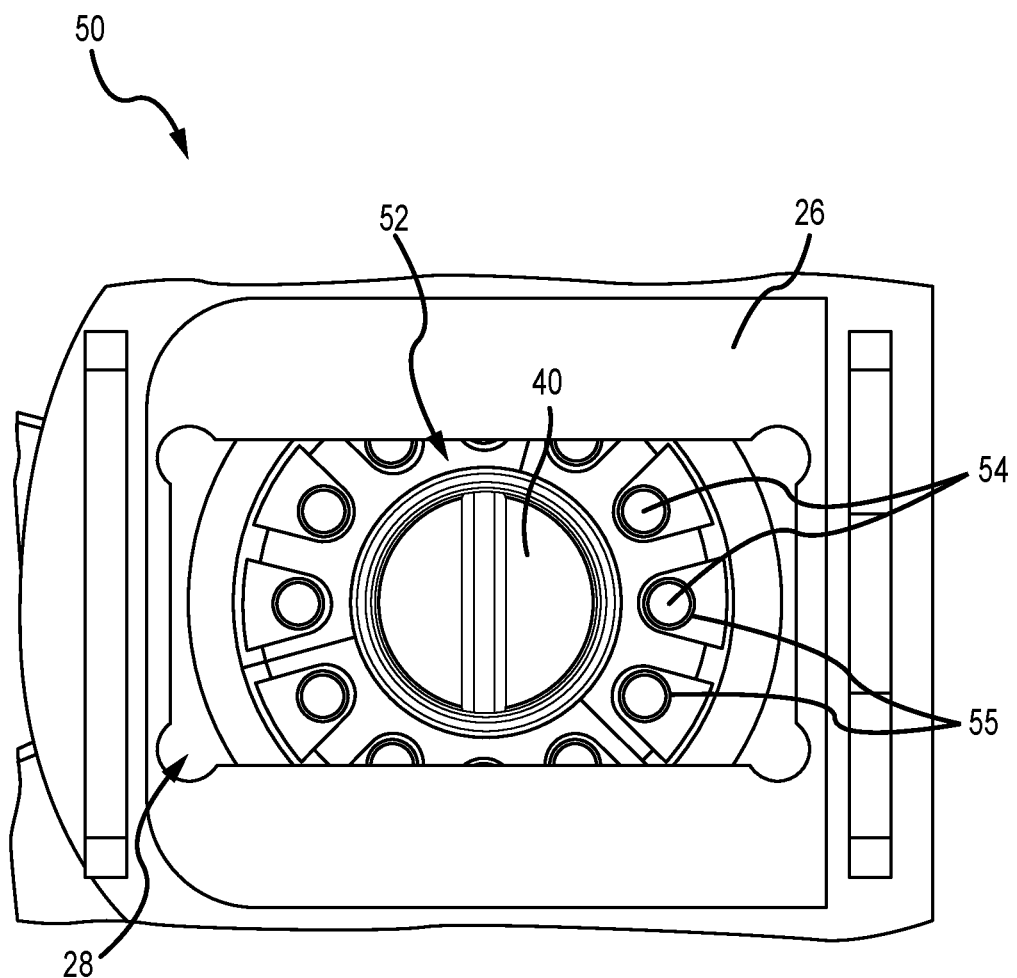
FIG. 4 is a left side view of a partially-assembled front idler assembly of FIG. 1.
Figure 5:
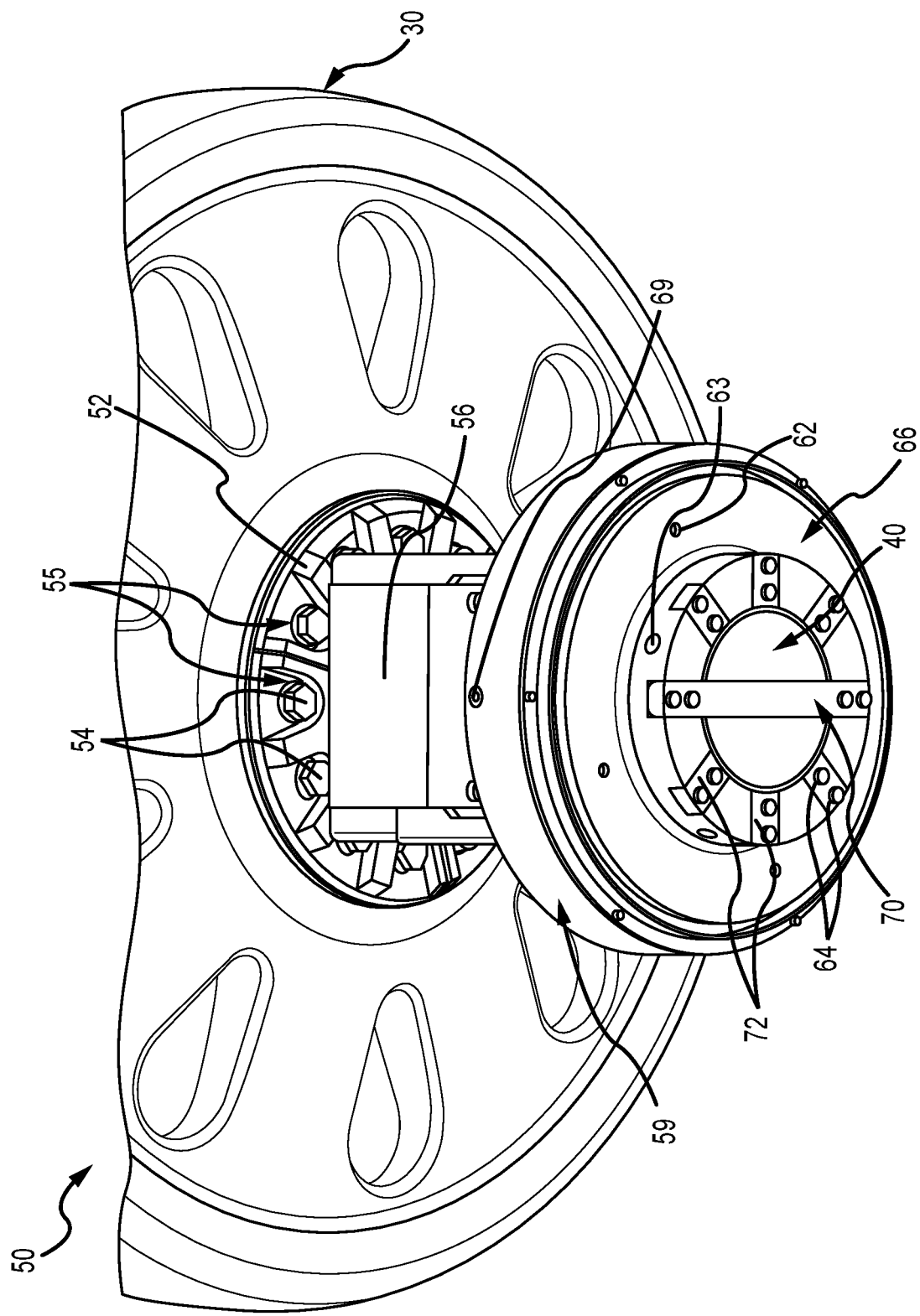
FIG. 5 is a partial top perspective view of the front idler assembly of FIG. 1.

The idler wheel 30 includes a bore 31 formed through a central axis of the idler wheel 30. An idler shaft 40 passes through the bore 31. The idler shaft 40 also passes through respective windows or openings on each of inboard arm 22 and outboard arm 24. Outboard arm window 28 is depicted in FIG. 4.

A locking key 45 is disposed centrally between the bore 31 of the idler wheel 30 and the idler shaft 40 and locks the rotation of the idler wheel 30 to the idler shaft 40 such that any rotational movement of the idler wheel 30 will result in rotational movement of the idler shaft 40. An outboard retainer assembly 50 is positioned adjacent the outboard arm 24 of the crawler frame 20, opposite an outboard arm face 26 of the crawler frame 20 (See FIG. 2, for example.) An inboard retainer assembly 80 is positioned adjacent the inboard arm 22 of the crawler frame (See FIG. 3, for example.)

The idler wheel 30 is locked to the idler shaft 40 both axially and rotationally; thereby, any forces (e.g. thrust forces, torsional forces) applied to the idler wheel 30 will in turn be applied to the idler shaft 40, and vice versa. By locking or rigidly connecting the idler wheel 30 and the idler shaft 40, wear is prevented between otherwise sliding surfaces of the two components. Generally, the idler wheel 30 is locked axially (or constrained axially) to the idler shaft 40 by way of a segmented retaining plate 52 engaged with an outboard side 34 (as opposed to an inboard side 32) of the idler wheel 30 on the outboard side, and by an inboard shoulder 42 of the idler shaft 40 which engages with the bore 31 of the idler wheel 30.

The segmented retaining plate 52 is attached by way of a set of plate bolts 54 and wedge-locking washers 55 to the outboard shoulder 44 of the idler shaft 40. The segmented retaining plate 52 locks the idler wheel 30 to the idler shaft 40 axially such that any axial movement of the idler wheel 30 will result in rotational movement of the idler shaft 40. Stated another way, the set of plate bolts 54 impart a sufficient clamping load to both the outboard vertical hub face 35 of the idler wheel 30 and the outboard shoulder 44 of the idler shaft 40 to rigidly attach the idler wheel 30 with the idler shaft 40. Note that each wedge-locking washer 55 is disposed below the head of a respective plate bolt 54 and intended to maintain preload on the plate bolts 54 to prevent them from backing out or vibrating loose. In one embodiment, the set of plate bolts 54 are 1.5-inch grade 8 bolts. In one embodiment, the set of plate bolts are twelve bolts in number.

The segmented retaining plate 52 is comprised of a set of retaining plate segments. In one embodiment, the segmented retaining plate 52 is comprised of three or more segments.

Collectively, the segments that comprise the segmented retaining plate 52 form a single retaining plate to secure or lock the idler wheel 30 to the idler wheel shaft 40. In one embodiment, the segmented retaining plate 52 is comprised of three segments. In one embodiment, the segmented retaining plate 52 is comprised of three segments, each of approximately equal radial span, i.e. of approximately 120-degree span. In one embodiment, each segment of the segmented retaining plate 52 weighs less than 35 pounds. In one embodiment, each segment of the segmented retaining plate 52 weighs approximately 30 pounds. In one embodiment, each segment of the segmented retaining plate 52 weighs no more than 30 pounds.

The segmentation of the segmented retaining plate 52 provides several advantages. For example, each segment is of lighter weight than a combined, single-piece retaining plate, thereby allowing easier movement and assembly/disassembly of the retaining plate. Also, separate segments allow a complete retaining plate 52 to be mounted without removal or breaking of the crawler tracks. Furthermore, by segmenting the retaining plate, the retaining plate may be installed after the shaft is positioned between arms of the crawler frame. Also, one or more plate bolts and one or more washers may be replaced without need to split the crawler tracks. In practice, one retaining plate 52 segment is installed at a time. After respective plate bolts 54 are installed, the idler wheel 30 is rotated 120 degrees and the next retaining plate 52 segment is installed. (See FIG. 4, in which a segmented retaining plate 52 of three segments is shown through the outboard arm window 28.)

The bearing block assembly 33, 56 comprises a journal bearing 71, 58 in which the idler shaft 40 rotates. The bearing block assembly 33, 56 is coupled to the outboard arm 24 of the crawler frame 20. A companion bearing block assembly 76 with journal bearing 98 is positioned opposite the idler wheel 30 and is coupled to the inboard arm 22 (See FIG. 7, for example.) The bearing block assembly 33, 56 may be fitted with one journal bearing lubrication port 97 and one thrust plate lubrication port 99 to provide separate and dedicated lubrication delivery to both the journal bearing 71, 58 and the thrust plate 65. A lube shield 79 is positioned directly above the lubrication ports 97 and 99 to protect fittings from debris.

In certain embodiments, one or more of the bearing block assemblies 56, 76 are reversible, such that a threshold wear on one side of a journal bearing 58, 98 may result in the block being reversed to impart wear to the other or opposite side, hence the identical lubrication ports and located on the opposite side with respect to bearing block assembly 76.

The bearing block assembly 56 further comprises a thrust plate housing 59 which allows the thrust plate 65 to be affixed outside the inboard arm 22 and outboard arm 24 for ease of access and maintenance. The thrust plate housing 59 provides an enclosed, sealed housing for the axial thrust surface between the rotating retainer nut 66 and the stationary thrust plate 65. The thrust plate 65 receives axial and frictional forces imparted by the idler shaft 40 and thus the retainer nut 66, such as may be generated when the crawler machine is turning. Generally, the seal 77 prevents or retards debris from entering the thrust plate housing 59 and keeps lubrication such as grease delivered from the thrust plate lubrication port 98 from departing the thrust plate housing 59. In one embodiment, the seal 77 provides a seal about the outer diameter of the retainer nut 66. In one embodiment, the seal 77 is a V-type seal.

The positioning of the thrust plate 65 outboard of the outboard arm 24 provides many advantages over conventional configurations in which a thrust plate is positioned inboard of an outboard arm (of a crawler frame). For example, in a conventional configuration, the thrust plate (and other components of an idler wheel assembly) are not visible, thereby not allowing inspection of components for wear, near failure, or complete failure. Furthermore, thrust plate(s) positioned inboard of an outboard arm are hard to position in place given the typically high weights involved. Maintenance or inspection of thrust plate(s) positioned inboard of an outboard arm also requires expensive and time-consuming splitting of track pads, which requires removing track pad pins and utilizing heavy machinery to lay the track pads down for access to inner thrust plates. Furthermore, a straddle mount shaft typically must be removed to replace inner thrust plates.

Figure 6:
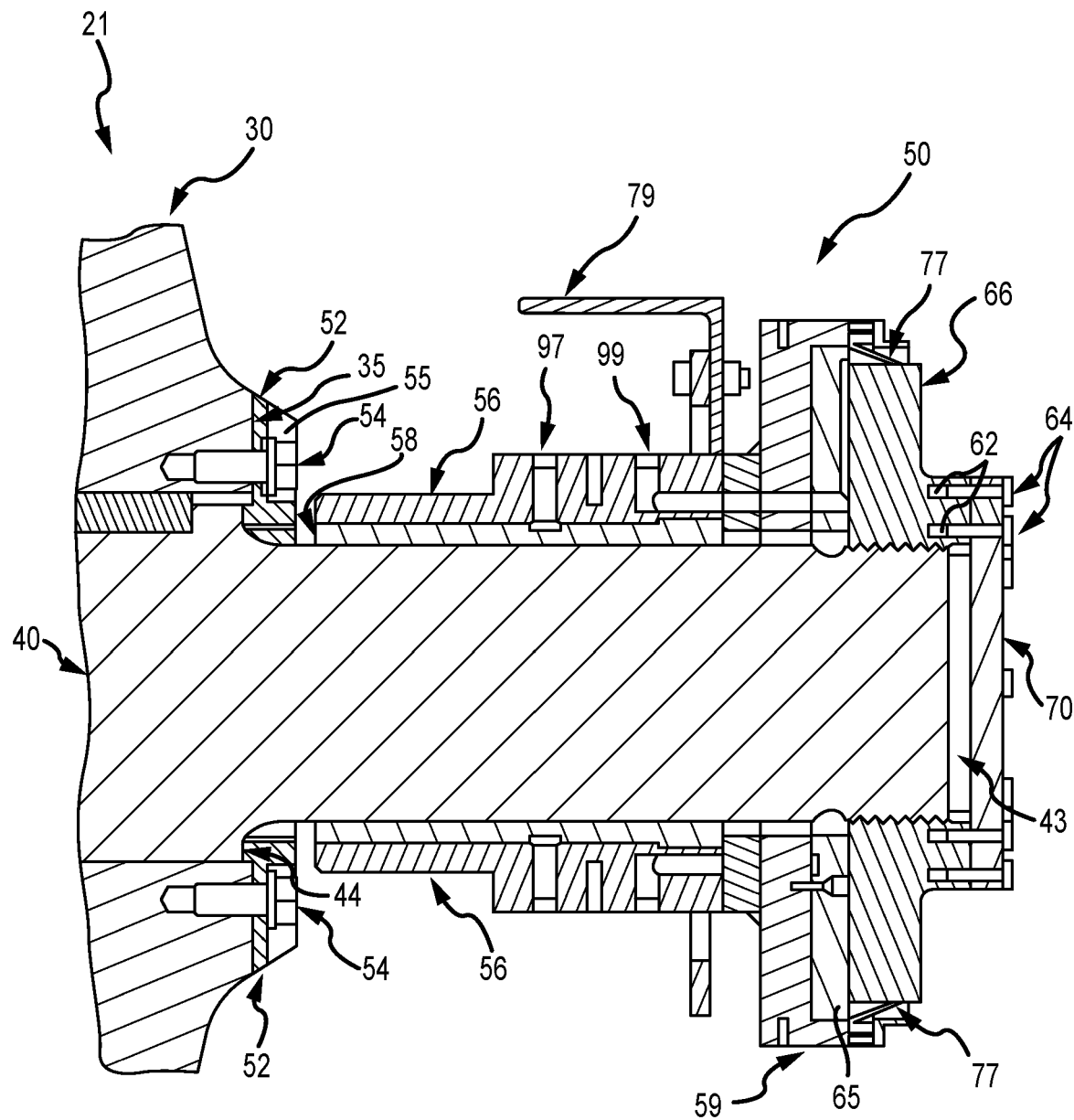
FIG. 6 is a partial front cut-away view of the front idler assembly of FIG. 1.
Figure 7:
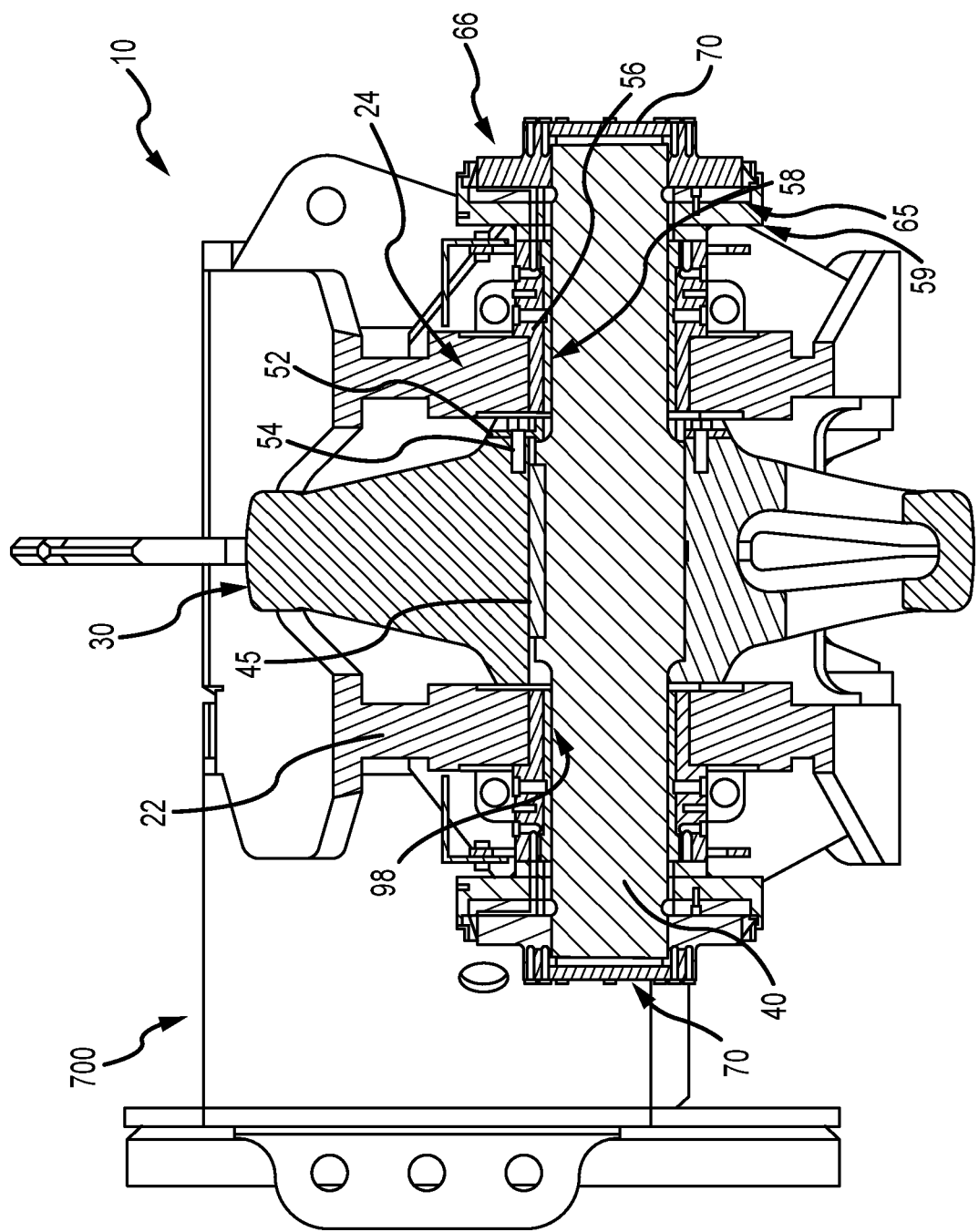
FIG. 7 is a front cut-away view of the front idler assembly of FIG. 1.

The retainer nut 66 threadably engages the idler shaft 40 and is installed through rotation by way of threads formed on the interior of the retainer nut 66 and threads formed on the exterior of the idler shaft 40 as seen in FIG. 6. The retainer nut 66 can be threaded onto the idler shaft 40 until the inboard surface contacts the surface of the thrust plate 65, thereby creating the intended thrust surface between the thrust plate 65 and the retainer nut 66. The retainer nut 66 comprises a series of radial grooves configured to receive a locking bar 70, and the retainer nut 66 is then locked rotationally to the idler shaft 40 via locking bar 70. The idler shaft 40 includes a shaft groove 43 formed on both end surfaces of the idler shaft 40 and the shaft groove 43 is configured to engage the locking bar 70. By locking the retainer nut 66 rotationally to the idler shaft 40, the retainer nut 66 will rotate in conjunction with both the idler wheel 30 and idler shaft 40, which is desirable to create a thrust surface between the stationary thrust plate 65 and the retainer nut 66.

Generally, the locking bar 70 is fastened to the retainer nut 66 via several plate bolts 64 (FIG. 5.) which ensure the locking bar 70 maintains affixed to the retainer nut 66. During installation of the retainer nut 66, once tightened against the thrust washer 65, the closest aligned radial groove of the retainer nut 66 is aligned with the shaft groove 43 by backing the retainer nut off counterclockwise, wherein the locking bar 70 is installed into the shaft groove 43. Place-holding blocks 72 are fitted to the unused radial grooves, i.e. the radial grooves in which the locking bar 70 is not inserted. Each place-holding block 72 is secured with one or more bolts 64 on both ends of the respective place-holding block 72. In one embodiment, the vacant radial grooves are configured to tighten or loosen the retaining nut 66 by utilizing a custom tool mounted to an impact wrench when the locking key is not engaged in a radial groove of the retainer nut 66. Similarly, one or more round bar apertures 63 are formed on an exterior diameter of the retainer nut 66 to allow the retainer nut 66 to be tightened with a round bar inserted into the round bar apertures 63. Element 69 is a lifting hole for the bearing block assembly 56.

A set of integrated inspection ports 62 (FIG. 5) are disposed in the axial direction of the retainer nut 66. The inspection ports 62 enable ready inspection of the thrust plate 65 wear, and are configured to allow receipt of a depth micrometer or other inspection devices, such as an optical probe. Note that measurements obtained from use of the inspection ports allow axial wear of the thrust plate 65 or retaining nut 66 to be monitored. In the event wear is beyond a threshold amount, the retainer nut 66 may be tightened. Note that because a threaded engagement is employed by the retainer nut, an essentially infinite number of adjustment settings are possible between the retaining nut 66 (and thus the thrust plate) and the idler shaft 40. In one embodiment, the thrust plate 65 is a 1.5-inch-thick plate, and the inspection ports 62 are covered via use of a plug when in operation to prevent entry of contaminants and debris.

Figure 8:
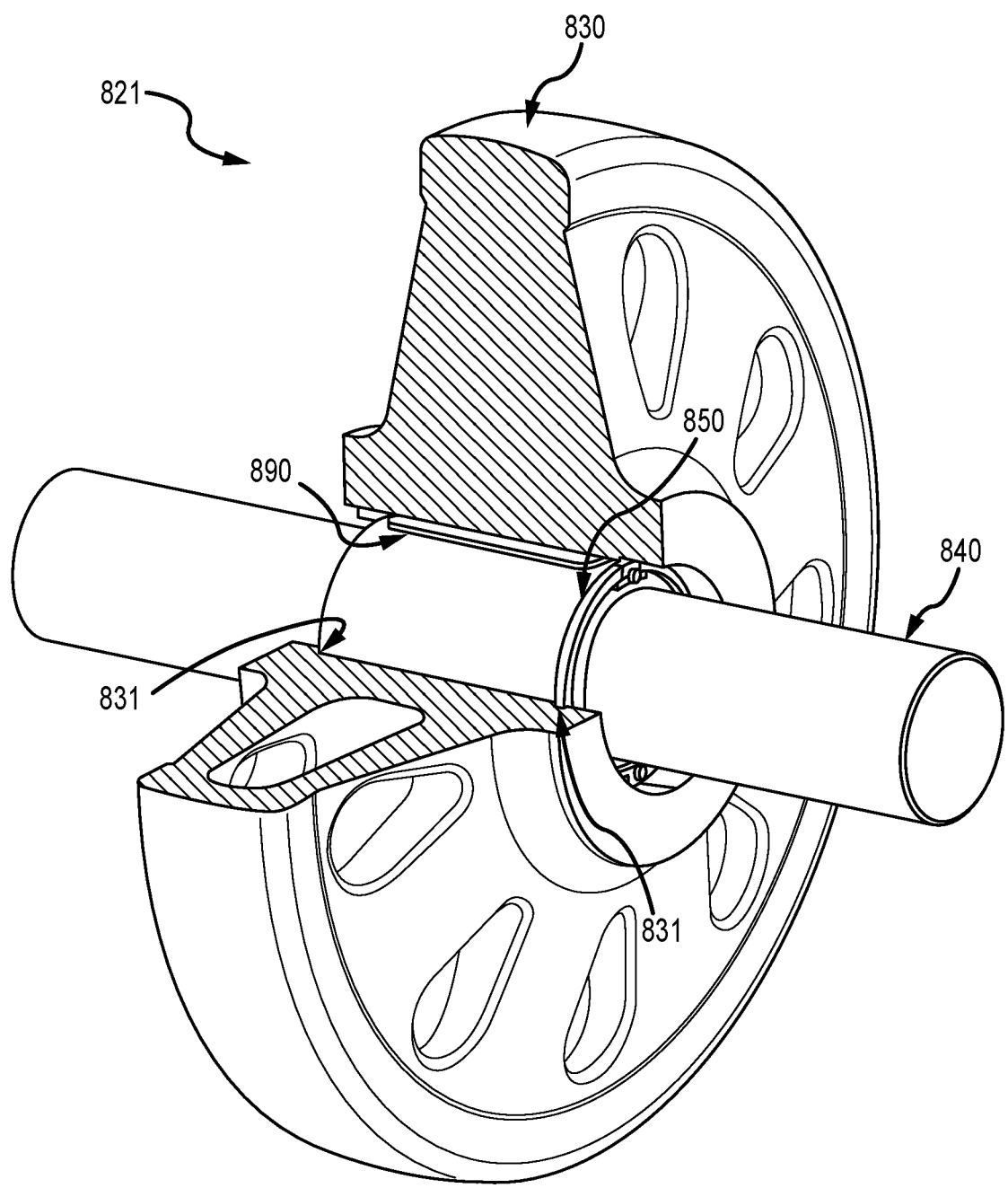
FIG. 8 is a front right-side perspective view of a portion of another embodiment of a front idler assembly.

Another embodiment of a front idler assembly 821 is provided in FIG. 8. Similar to the embodiment of a front idler assembly 21 of FIGS. 1-7, the front idler assembly 821 includes an idler wheel 830 with a central bore, through which an idler shaft 840 passes. However, the front idler assembly 821 includes a snap ring 850 which enables the idler wheel 830 to lock to the idler shaft 840 by way of an idler wheel groove 831 formed around a circumference of the idler wheel 830. The snap ring 840 may also be referred to as a thrust ring or a retaining ring. The snap ring 850, as fitted to the idler wheel groove 831, locks the idler wheel to the idler shaft 840. In one embodiment, the snap ring 850 is of approximately ¾ inch thickness. In one embodiment, the snap ring 850 is segmented. For example, in one embodiment, the snap ring 850 comprises two or more segments. In one embodiment, the snap ring 850 is segmented and, once all segments are positioned in the idler wheel groove 831 and interconnected, the interconnected segments forming the snap ring 850 are rotated within the idler wheel groove 831 to receive a block or wedge. The block or wedge is configured such that the interconnected segments remain in the idler wheel groove 831. More specifically, the snap ring 850 prevents axial movement, and a key 890 prevents rotational movement. The idler wheel 830 is configured with a shoulder 831 which engages a step on the idler shaft. The block or wedge may prevent axial and rotational movement of the idler wheel with respect to the idler shaft (i.e. the idler wheel and the idler shaft are locked together.)

In one embodiment, the snap ring 830 is fitted to a groove formed along a diameter of the idler shaft 840 rather than fitted to a groove formed within the inner bore of the idler wheel 830.

The embodiment of a front idler assembly 821 provided in FIG. 8 could be fitted to the outboard retainer assembly 50 of FIGS. 1-7. For example, the front idler assembly 821 may employ a snap ring 850 design to lock the idler wheel and an idler shaft, yet utilize the retainer nut 66, bar 70, and thrust plate 65 described above. Such a front idler design would provide many of the advantages described above, to include placement of the thrust surface outboard of the crawler arms. In one embodiment, the snap ring 850 of the front idler assembly 821 substitutes for the segmented retaining plate 52 and associated components (i.e. the washers 55 and plate bolts 54), but otherwise the features of the front idler assembly 21 are employed.

The exemplary systems and methods of this disclosure have been described in relation to idler assemblies. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A front idler assembly comprising:
an idler wheel comprising a bore therethrough and configured to operate within a front aperture of a crawler frame;
an inboard arm and an outboard arm, each formed on a distal end of the crawler frame and together defining the front aperture;
an idler shaft passing through the bore and coupled to each of the inboard arm and the outboard arm, wherein the idler shaft is fixed to the idler wheel by way of a locking key;
a pair of journal bearings housed within a respective pair of bearing block assemblies, the pair of journal bearings positioned adjacent an inboard side and an outboard side of the idler wheel;
a segmented retaining plate connected to each of an outboard vertical face of a hub of the idler wheel and an outboard shoulder of the idler shaft; and
an outboard retainer assembly coupled to an outboard end of the idler shaft;
wherein the segmented retaining plate axially fixes the idler wheel relative to the idler shaft and wherein the idler wheel is fixed relative to the idler shaft both axially and rotationally.

2. The assembly of claim 1, wherein the segmented retaining plate comprises at least three retaining plate segments.

3. The assembly of claim 1, wherein the segmented retaining plate is connected to the idler wheel and to the idler shaft by a set of plate bolts.

4. The assembly of claim 3, further comprising a set of wedge locking washers connected to the set of plate bolts, the set of wedge locking washers enable a preload to the segmented retaining plate.

5. The assembly of claim 1, wherein a locking bar is configured to engage a shaft groove formed on a distal end of the idler shaft.

6. The assembly of claim 5, wherein the locking bar rotationally fixes a retainer nut relative to the idler shaft.

7. The assembly of claim 1, further comprising a thrust plate, the thrust plate disposed outboard of the outboard arm and configured to receive a friction force.

8. The assembly of claim 7, wherein the thrust plate is connected to a dedicated lubrication port.

9. The assembly of claim 8, further comprising a second thrust plate disposed outboard of the inboard arm.

10. The assembly of claim 1, wherein the outboard retainer assembly comprises a retainer nut configured to threadably engage the idler shaft.

11. The assembly of claim 10, wherein the retainer nut comprises a set of inspection ports configured to enable measurement of a depth of a thrust plate, the thrust plate disposed outboard of the outboard arm and configured to receive a friction force.

12. A straddle mount idler device comprising:
an idler shaft configured to pass through adjacent windows of an inboard arm and an outboard arm of a crawler frame;
an idler wheel coupled to the idler shaft through a central bore of the idler wheel;
a pair of journal bearings coupled to the idler wheel and positioned on an inboard side and an outboard side of the idler wheel;
a first thrust plate and a second thrust plate, the first thrust plate positioned outboard of the outboard arm and the second thrust plate positioned outboard of the inboard arm, each thrust plate configured to receive at least axial force received from the idler shaft;
a segmented retaining plate connected to each of an outboard vertical face of a hub of the idler wheel and an outboard shoulder of the idler shaft;
wherein, the segmented retaining plate axially fixes the idler wheel relative to the idler shaft; and
a locking key rotationally fixes the idler wheel relative to the idler shaft;
wherein the idler wheel and the idler shaft are locked radially and locked axially.

13. The device of claim 12, wherein the each of the first thrust plate and a second thrust plate are:
sealed from external contaminants;
connected to a dedicated lubrication port;
accessible without splitting of crawler tracks engaged with the crawler frame; and
measurable for wear by way of a set of inspection ports.

14. The device of claim 13, further comprising a pair of journal bearings housed within a respective pair of bearing block assemblies, wherein:
the pair of journal bearings are positioned adjacent an inboard side and an outboard side of the idler wheel; and
the first thrust plate and a second thrust plate are coupled to a bearing block assembly.

15. The device of claim 13, further comprising:
a retainer nut configured to threadably engage the idler shaft and to receive a locking bar along a set of radial grooves formed on a distal end of the retainer nut and a segmented retaining plate connected to each of an outboard vertical face of a hub of the idler wheel and an outboard shoulder of the idler shaft;
wherein:
the segmented retaining plate axially fixes the idler wheel relative to the idler shaft; and
the locking key rotationally fixes the idler wheel relative to the idler shaft.

16. A straddle mount idler device comprising:
an idler wheel comprising a bore therethrough and configured to operate within a front aperture of a crawler frame;
an idler shaft passing through the bore and configured to pass through adjacent windows of an inboard arm and an outboard arm of the crawler frame;
a pair of journal bearings coupled to the idler wheel and positioned adjacent an inboard side and an outboard side of the idler wheel;
an outboard retainer assembly coupled to an outboard end of the idler shaft, the outboard retainer assembly comprising a retainer nut configured to threadably engage the idler shaft and to receive a locking bar along a set of radial grooves formed on a distal end of the retainer nut; wherein:
the set of radial grooves allow incremental adjustment of the retainer nut;
the retainer nut comprises a set of apertures configured to receive a round bar and a set of inspection ports;
a segmented retaining plate connected to each of an outboard vertical face of a hub of the idler wheel and an outboard shoulder of the idler shaft; wherein:

the segmented retaining plate axially fixes the idler wheel relative to the idler shaft;

the idler wheel is fixed relative to the idler shaft both axially and rotationally; and a locking key rotationally fixes the idler wheel relative to the idler shaft.

17. The device of claim 16, further comprising a first thrust plate and a second thrust plate, the first thrust plate positioned outboard of the outboard arm and the second thrust plate positioned outboard of the inboard arm, each thrust plate configured to receive at least axial force received from the idler shaft; wherein:

each of the first thrust plate and a second thrust plate are:
sealed from external contaminants;
connected to a dedicated lubrication port;
accessible without splitting of crawler tracks engaged with the crawler frame; and
measurable for wear by way of the set of inspection ports; and the retainer nut further is configured to receive a tool that engages the radial grooves, the tool configured to couple to at least one of an impact tool and a hydraulic wrench.

* * * * *